(12) United States Patent
Nixon

(10) Patent No.: US 6,584,185 B1
(45) Date of Patent: Jun. 24, 2003

(54) TELEPHONE ABSTRACTION LAYER AND SYSTEM IN A COMPUTER TELEPHONY SYSTEM

(75) Inventor: Toby Lee Nixon, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/495,081

(22) Filed: Jan. 31, 2000

(51) Int. Cl.[7] .............................................. H04M 3/42
(52) U.S. Cl. ................................. 379/201.01; 379/242
(58) Field of Search ....................... 379/201.01, 201.02, 379/201.03, 242, 221.08, 244, 220.01, 221.09

(56) References Cited

U.S. PATENT DOCUMENTS 6,480,597 B1 * 11/2002 Kult et al. .................... 379/242

OTHER PUBLICATIONS

Toby Nixon, "Windows Telephony (TAPI) Support in Windows NT 4.0," Microsoft Corporation, [web page], Jun. 1996. http://msdn.microsoft.com/library/techart/msdn_tapiwp.htm. [Accessed Oct. 16, 1999].
Nancy Winnick Cluts, "TAP into the Future," Microsoft Corporation, [web page], Nov. 1995. http://msdn.microsoft.com/library/techart/msdn_tapinto.htm. [Accessed Oct. 16, 1999].
Enterprise Computer Telephony Forum, "Bringing Interoperability to Computer Telephony," [web page], 1999. http://www.ectf.org. [Accessed Oct. 13, 1999].
Advanced Computer Communications, "Internet Telephony," Oct. 1998.
Dialogic: An Intel Company, "CT Media: A Breakthrough in Client/Server Computer Telephony," [web page], Mar. 23, 1999. http://www.dialogic.com/products/ctmedia/2975web.htm. [Accessed Oct. 13, 1999].
Microsoft Corporation, "IP Telephony with TAPI 3.0—Apr. 1999 ed.," *Microsoft Developer's Network CD,* Jul. 1999.
Microsoft Corporation, "IP Telephony with TAPI 3.0—May 28, 1999 ed.," *Microsoft Developer's Network CD,* Jul. 1999.
Paul Ranford, "System Architecture Specification for Packaging of CTMedia Packaging," Diaglogic, May 17, 1999.
Paul Ranford et al., "System Architecture Specification for OpenISE," Dialogic, Apr. 1, 1999.
Stephen Fenwick, "Unite Design Specification for Supplementary Service Control Subsystem—Draft Version," Dialogic, Feb. 24, 1999.
Dialogic, "Microsoft Cell Management Platform Functional Requirements," Jun. 30, 1999.
Navindra Ramachandran, "Unit Design Specification for Call Control Agent," Dialogic, Jul. 6, 1999.
Dialogic, "CT Server Adminstration Requirements—Revision 1.4," Jun. 28, 1999.
Vishwa Kumbalimutt, "Valhalla Management Framework," Microsoft Coproration, Jul. 16, 1999.
Microsoft Corporation, "Valhalla: ISV Launch Partners Analysis and Recommendations," Aug. 8, 1999.
Hirt, "Microsoft CMP Attendant Console Functional Requirements—Revision 1.0," Dialogic, Jun. 24, 1999.

* cited by examiner

*Primary Examiner*—Creighton Smith
(74) *Attorney, Agent, or Firm*—Leydig, Voit & Mayer, Ltd.

(57) ABSTRACT

Presented is a telephony system capable of supporting and properly interfacing with a wide variety of telephones or station sets produced by various manufacturers, including analog, ISDN, proprietary digital, etc. This support is enabled through the inclusion of a telephone abstraction layer in the core telephony software that removes the detailed interface to a particular phone common in modern telephony systems. Telephone abstraction drivers for each type of phone receive the abstraction commands and information and translate them into commands and information for proper interfacing, display, signaling, functional assignment, etc. for that type of phone. The information provided from the abstraction layer may be more than the particular phone may be able to display, in which case the telephone abstraction drivers prioritize the information and send only what it deems appropriate to the station set. Alternatively, the telephone abstraction drivers may access a database to extract desired information for display. Customization of the station set personality is also provided by the telephone abstraction drivers, which allows transportability of a user's settings between different phones connected to the system.

21 Claims, 4 Drawing Sheets

TELEPHONE ABSTRACTION LAYER AND SYSTEM IN A COMPUTER TELEPHONY SYSTEM

TECHNICAL FIELD

This invention relates generally to computer telephony systems and, more particularly, to systems and methods for providing telephone functionality and interfacing to a physical telephone in a computer telephony system.

BACKGROUND OF THE INVENTION

An enterprise's telephone system is often the business's primary lifeline, maintaining contact with clients and customers, allowing it to receive orders, conducting conferences, soliciting new business, etc. As such, it is vitally important that an adequate number of telephone lines be available to the enterprise's use as needed. Unfortunately, business economic decisions almost completely prohibit each employee from having a direct link to a telephone line at all times. The cost of such a high number of telephone lines dedicated for each employee is simply prohibitive. Further, such a system of direct linkage does not easily accommodate calls between internal employees within the business enterprise without utilizing the direct external lines. Fortunately, private branch exchanges (PBXs) were developed and made available to business enterprises.

A PBX is a telephone system within the enterprise that switches calls between enterprise users on local lines within the business, while allowing all users to share a certain number of external phone lines. The PBX is typically privately owned by the business enterprise, and may be thought of as a small version of the primary telephone carrier's central switching office. The primary benefit to a business enterprise for owning a PBX system is the efficiency and cost savings of sharing a specific small number of telephone lines among a large group of employees. In this way, all employees have access to external customers and clients, albeit not all at the same time. However, within the business enterprise users may freely contact other enterprise employees in single and multi-party conferences without incurring any line usage time for their external telephone lines. Further, such calls and multi-party conferences do not occupy the incoming or outgoing telephone lines so that the business may continue to conduct normal business with its customers and clients. While the original PBX systems included large switchboards managed by telephone operators, modem day PBX systems have automated the functions of routing incoming calls to specific extensions and placing outgoing calls. These modern PBX systems are more specifically known as private automatic branch exchanges (PABXs), however both terms may be and are used interchangeably.

In addition to the basic call switching functions, modern PBX systems offer numerous additional features known as "supplementary services", such as call hold, transfer, conferencing, park, and pickup; these supplementary services features number in the hundreds in most modem PBX systems. Modern PBX systems are typically provided to a business enterprise with proprietary digital telephones that offer dedicated or soft function keys and display screens to access those features. Currently, most PBX systems are sold as a complete business solution provided by a single PBX system provider. This total business solution includes both the functional hardware and software for the routing and switching of calls carried therein, and the particular proprietary digital phones placed on each employee's desk for accessing the features and functions of the system.

In the typical PBX system, the proprietary digital phones include many fixed and programmable buttons, lights, soft keys, and typically a display screen for relaying certain textural and graphical information to the enterprise user. While these proprietary digital phones provide the direct user interface to the PBX system, and allow users to individually program various buttons provided thereon, these digital phones are actually relatively unintelligent devices. The actual intelligence which lies behind the physical programmable buttons, display, lights, and ringers exists within the PBX's software programming. Specifically, the particular PBX system sold to the business enterprise contains low level driver functionality incorporated within the core software of the PBX system to drive the individual proprietary digital phones (often referred to as station sets) in a known physical way. That is to say, the PBX system software incorporates drivers for a particular physical configuration of the station set sold with the system, These drivers allow the PBX system to light a particular light and respond a particular way to a given button pressed on the station set. This functionality does not lie within the station set itself. Therefore, when a station set flashes a call waiting button, it does so as a direct result of the PBX core software driving that particular light in response to a call waiting situation. The station set itself does not contain intelligence which allows it to determine that a call is waiting and choose a proper user indication.

While such a configuration allows for PBX vendor differentiation based upon the number of features and style of phone offered, it also ties a business enterprise to its PBX supplier for all services and hardware, including replacement telephones. While it is possible for third-party telephone vendors to provide replacement telephones, such phones could not use the particular configuration as supplied by the original PBX system supplier since these phones are typically proprietary. Additionally, new software would need to be written and integrated within the PBX core software to allow proper interfacing with the new style phone. Unfortunately, since the typical PBX system incorporates the telephone interface and functional accessing features within the core of the PBX operating software, such a third-party solution becomes cost and technically prohibitive. Further, most business enterprises would not want a third-party telephone vendor implementing software within the core of its PBX operating system.

The practical result of this situation is that a business enterprise is confined to particular proprietary digital telephones supplied with the PBX system, or other models provided by their PBX supplier which are also supported by the installed PBX system. Such a situation allows PBX suppliers to provide their core operating system at a very low cost because once installed, the business enterprise becomes a captive client for all future telephone purchases to be used with the system. This is a very profitable situation for the PBX supplier, but is not desirable from the business enterprise standpoint. Unfortunately, since the telephone interface is imbedded within and distributed throughout the PBX core operating software, a solution to this problem must begin at the core operating system level. It is such a solution that is presented by the instant invention.

SUMMARY OF THE INVENTION

The inventive concepts disclosed in this application involve a telephony system which includes as part of its core a telephone abstraction capable of interfacing with telephone abstractions drivers (TAD), which contain specific information for a particular type of telephone. This abstraction enables the telephony system to operate with any type of telephone. As used herein, telephone and phone should be understood to include all types of peripheral endpoints on the telephone system, including but not limited to simply telephones. The interoperability is gained by pushing the high level functionality of each particular type of telephone out of the core telephony system and into the individual telephone abstraction drivers (TAD) for a particular manufacturer or a particular model telephone. In this way a telephone manufacturer would supply its model telephone along with a software TAD to allow its phone to be utilized with the telephony system. As a result, the telephony system of the instant invention becomes an open system whereby the manufacturer of the telephony system may easily integrate telephones produced by third-party telephone vendors, or permit third-party telephone vendors to sell equipment directly to value-added resellers or end user customers for attachment to telephony systems in the field without the necessity for direct coordination with the telephony system provider.

As discussed above, current PBX and other telephony systems are closed, monolithic systems wherein the only telephones supported by the system are those supplied by the manufacturer of the overall system itself. A majority of these telephones are proprietary digital phones whose functionality is embedded in and controlled by the core software of the telephony system. The phones themselves are typically unintelligent and merely provide the button illumination, screen display, ring type, and phone functions which are specifically supplied by the core telephony system. Integrating a new telephone type is an arduous and complex process involving modifications to the core elements of the system, requiring expert knowledge and access to sensitive proprietary design information and interfaces. This essentially prohibits any third-party vendor from building telephones to be used interchangeably with these closed systems.

The system of this invention, therefore, provides within the core telephony system a telephone abstraction layer which provides the call, line, and phone functions as well as the information to be displayed and physical configuration at a high level abstraction that may be interpreted and properly displayed by any telephone coupled to the system. In an exemplary platform, the system of the instant invention provides the high level telephone abstraction to the supplementary services application (SSA) layer above the basic call switching layer. With this abstraction, the SSA merely passes down the information and call control functionality to be displayed by the telephone through the basic call switching layer in a prioritized fashion. This information is received by the TAD, which actually takes care of the proper formatting and display conversion necessary to properly display and control the actual physical telephone coupled to the system (access to the telephone hardware may be achieved through hardware device drivers, through a middleware hardware abstraction layer, or by other means). The particular TAD for the telephone coupled to the system will display on the physical telephone the information provided to it as it deems appropriate, which display may be a subset of the actual information provided by the SSA, and which may include additional information not supplied by the SSA. For example, a phone conforming to Telcordia (formerly Bellcore) standards for ISDN Centrex would only be able to display 2 lines by 20 characters whereas some other model digital phone may be able to display vastly greater information on a much larger higher resolution display. Further, the TAD could provide an interface to software executing on a personal computer (PC) that allows the PC to act as a phone, in which case all of the possible information supplied may be displayed to the user on a graphical user interface on a video monitor, using the PC multimedia subsystem, etc., depending on design requirements.

The system of the instant invention contemplates various alternatives for the mechanism which supplies the information ultimately to be displayed to the telephone. The SSA may directly access the directory service of the underlying operating system software to extract the relevant information relating to the call, and transport that information through the basic call switching software to the TAD for processing therein. The TAD would then determine in a prioritized fashion which of that information sent to it would be formatted for actual display on the particular telephone coupled to the telephony system. Alternatively, the SSA may merely pass basic call information to the TAD along with a pointer to the directory identifying the location of the relevant information relating to the call. It would then be the responsibility of the TAD to extract the relevant information from the directory for display on the particular telephone. In this way, information which cannot be displayed on the particular telephone is not passed to the TAD, resulting in more efficient operation.

Additionally, the system of the instant invention also contemplates the use of various helper functions which may contain pre-formatted display strings based upon certain telephony standards. Once such standard specification is the Telcordia (Bellcore) specification for telephones used with an ISDN Centrex system, which outlines the basic telephone display for a two-line by twenty-character display. In this way, pre-formatted code may be supplied to the TAD so that the standardized display strings would not need to be formatted within each of the TAD's for the various models of telephones. These helper functions could also contain strings in multiple languages to localize the display information for the telephone in various countries or based on user preferences.

By providing specific telephone functionality at the TAD level (as opposed to within the core telephony software) the system of the instant invention allows the behavior and user interface of the telephone to be personalized to the particular user of that telephone. Specifically, functionality may be provided within the TAD to allow a particular user to configure the telephone to his or her liking by selecting various speed dial numbers, ring types, display formats, display and audible message languages, etc. This personality may be stored in the directory by allowing the TAD to add sections for the particular client listing provided therein. With such a provision, a user may be able to log in to the telephony system, identify himself to his phone, and have the telephone configure itself to the individual's preprogrammed and personalized configuration. In this way, the telephone will be configured to the user's preferences regardless of the user's and the telephone's physical location within the business enterprise. Such a system is particularly applicable in a company which utilizes a "hoteling" environment, such as a field sales office or call center, in which individuals use any available office on a given day and are not permanently assigned to a physical work location.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
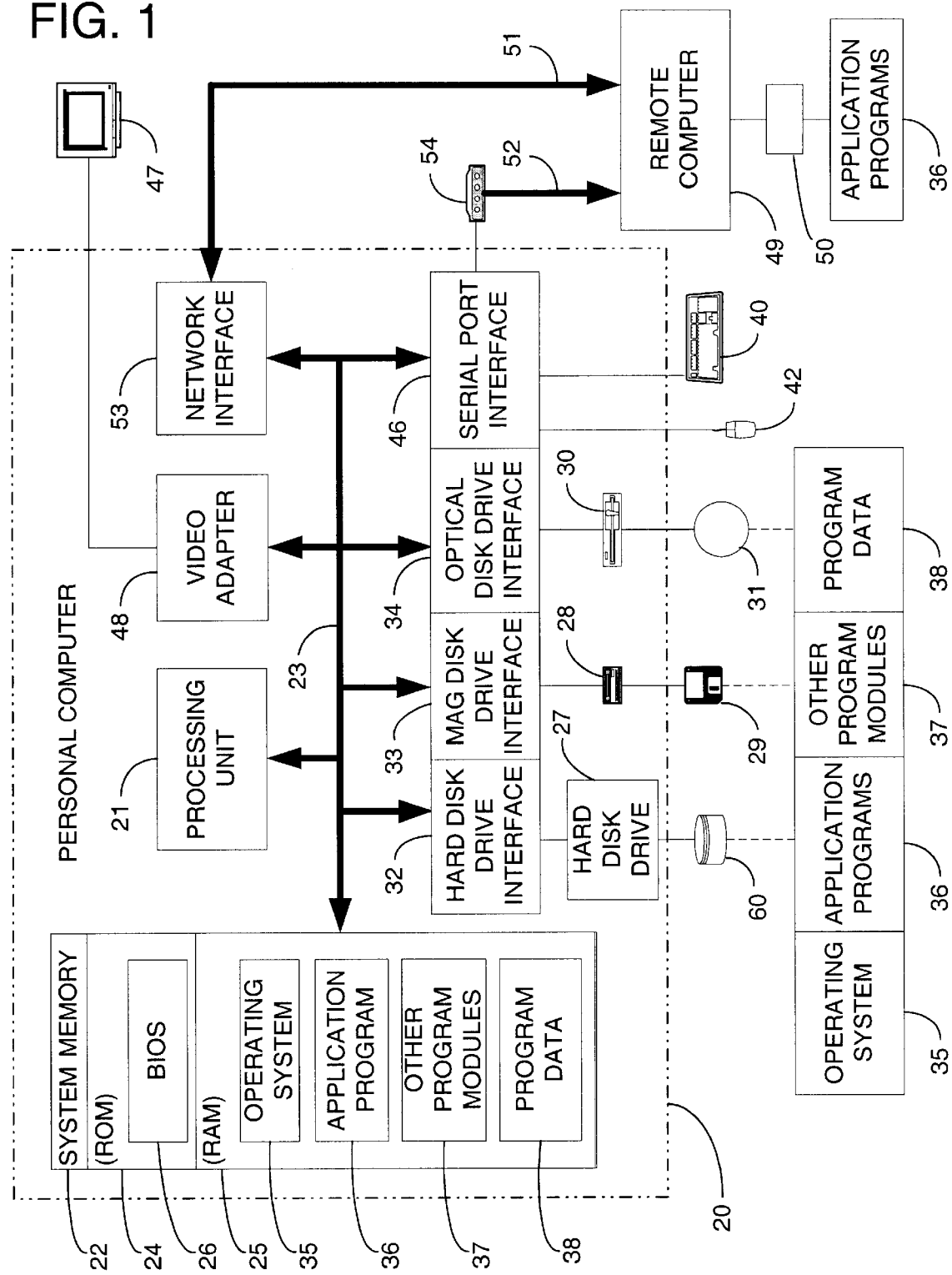
FIG. 1 is a block diagram generally illustrating an exemplary computer system.

Turning to the drawings, wherein like reference numerals refer to like elements, a typical computing environment is illustrated in FIG. 1. Although not required, the invention will be described in the general context of computer-executable instructions, such as program modules, being executed by a computer system which may include a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the personal computer 20. Although the exemplary environment described herein employs a hard disk, a removable magnetic disk 29, and a removable optical disk 31, it will be appreciated by those skilled in the art that other types of computer-readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those with skill in the art will appreciate that various of the acts and operation described hereinafter may also be implemented in hardware.

Figure 2:
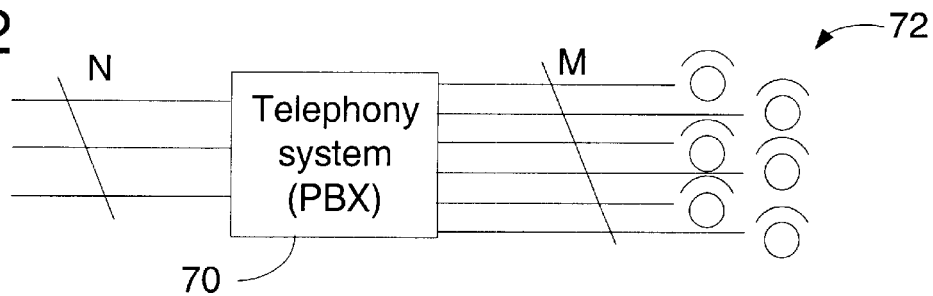
FIG. 2 is a simplified block diagram illustrating the system configuration of a basic telephony system for use in a business enterprise constructed in accordance with the teachings of the instant invention.

Turning now to the details of the system of the instant invention, reference is made first to the simplified block diagram of FIG. 2. As illustrated in this FIG. 2, a basic telephony system incorporating the teachings of the instant invention may be illustrated simply as a PBX box 70 having no external data lines entering the system 70 and M internal lines distributed throughout the business enterprise. As is typical, the number of internal lines M is greater than the number of external lines N dedicated to the business enterprise. While the simplified block diagram of FIG. 2 may also be illustrative of a conventional telephony system, a difference in the system of the instant invention lies in the fact that the telephones or station sets 72 may be provided by third-party manufacturers. These third-party manufacturers would also need to supply a low level driver to be installed in the telephony system 70 so that proper interfacing to the particular model station set could be accomplished.

Figure 3:
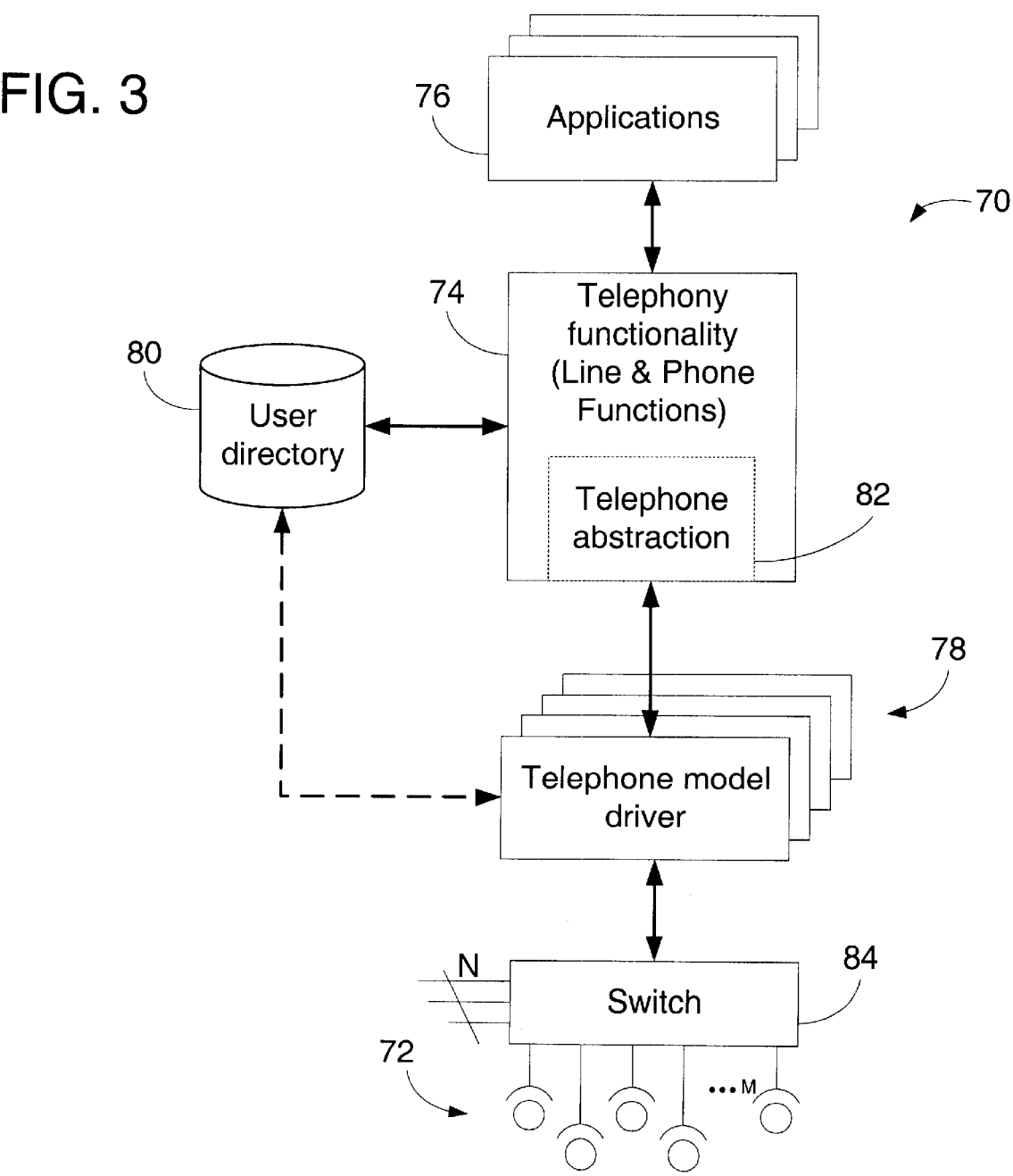
FIG. 3 is a block diagram generally illustrating in greater detail the telephony system of FIG. 2 incorporating the teachings of the instant invention.

In analyzing how such functionality is possible in a telephony system 70, specific reference is now made to the simplified block diagram of FIG. 3. As will be apparent to those skilled in the art, this simplified block diagram is generic to any particular operating system. Preferably, the system of the instant invention is implemented in some type of modular or object oriented programming environment, such as for example, the component object model (COM) developed by the assignee of the instant application. Such a modular architecture allows for segregation of the core telephony functionality 74 from the application programs 76, which may be supplied by third-party vendors to increase the functionality and add new features to the core telephony system 70 of the instant invention. Such modularity also allows third-party station set manufacturers to supply the low level telephone model drivers 78 to allow the core telephony system 74 to operate properly with their station sets 72.

Focusing now on the specifics of FIG. 3, the core telephony functionality including the call, line and phone functions of the system are incorporated in the core telephony software 74. Third-party application programs 76 interface with the core telephony software 74 and provide additional functionality and features to the core telephony system. As will be recognized by one skilled in the art, such application programs may include voice mail, interactive voice response systems, etc. The core telephony system 74 also preferably interfaces with a directory or database 80 which serves as a central depository for information for the system including users, services, hardware and software configuration, etc. In a preferred computer telephony system, this directory may be shared with other systems operating within the business enterprise. User information stored in the directory may include name, direct line telephone number, department, e-mail address, network security information and privileges, etc. As will be described more fully below, this directory may also be supplemented with telephony specific information through the system of the instant invention including, for example, speed dial setup, ring type, display preferences, etc.

Unlike the monolithic telephony systems of the past, the core telephony functionality software 74 contains a telephone abstraction 82 to communicate telephony function, display information, etc. in a standardized way to a low level telephone model driver 78. It is then the duty of this low level telephone model driver 78 to translate the communicated information from the telephone abstraction 82 into a form to properly drive and otherwise communicate with the physical station sets. Preferably the telephone model drivers 78 do not interact directly with the station sets 72, but communicate through the telephony switch 84 which contains all of the necessary hardware drivers and interfaces to perform the actual hardware/software communication.

Through the system of the instant invention, the core telephony software 74 no longer is concerned with which button on a station set is programmed to perform which function, or which light must be continuously illuminated or flashed to signify a particular operation. As an example, if a user depresses "button number 5" on a particular station set, the telephone model driver 78 is provided with this physical implementation information, determines from configuration information (a "button template") stored in the directory or elsewhere that this button number corresponds to a request to transfer the call, and passes a call transfer request to the telephone abstraction layer 82 of the core telephony system 74. The telephone abstraction layer does not know which physical button was depressed to signify such desired action, but only knows that a particular function now must be performed by the telephony system.

Likewise, the telephone abstraction layer need only communicate abstract information to the telephone model driver 78 to signify certain information from the telephony system. As an example, the telephone abstraction layer 82 may transmit call waiting information to the telephone model driver 78 which then translates this information and commands the station set to flash indicator number 2 at a 5 hertz rate and generate "sound number 3" once every 5 seconds. Prior to the system of the instant invention, such low level details about the particular physical configuration of the station set were embedded within the telephony functional core software 74. This monolithic design required that the business enterprise, in order to utilize different phones, would have to open up the core of its telephony system to a third-party telephone vendor to allow changes to this low level code so that it could properly interface with the new device, which is not an appealing prospect. Often the telephony system provider prohibits such core system tampering, effectively ensuring that no one else may supply station sets to that business enterprise so long as their telephony system is in place.

Since the system of the instant invention implements a telephone abstraction layer 82 which is unconcerned with the particular type of telephone coupled to the system, the information which it supplies may not always be applicable for or usable by a connected phone. That is to say, the telephone abstraction layer 82 produces information for usage and display by an abstract telephone, and not for any phone in particular. Therefore, information provided by the telephone abstraction layer 82 may not be capable of being displayed on the particular station set coupled to the system. Because it is recognized that station sets from different manufacturers will have different physical configurations and display sizes, the information provided by the telephone abstraction layer 82 is transmitted in a prioritized manner so that the telephone model driver 78 may begin the information display with the highest priority information provided by the telephone abstraction layer 82 and may simply truncate further display once the display area has been filled.

This prioritization of support also is utilized for functions available through the telephony system, but which may not be supportable on the particular model phone coupled to the system. In this case, the telephone abstraction layer 82 simply provides the functions which are available in the given state, and it is up to the telephone model driver 78 to make these functions available utilizing the given physical configuration of the particular model phone. For example, the telephone model driver 78 may assign a hard (dedicated) key to the call transfer function, while providing additional functionality through its internally designated soft key functions.

Additionally, the telephone abstraction layer 82 does not command any particular ring type, but instead provides an abstraction of the kind of sound that the phone should be making, and leaves it to the telephone model driver 78 to determine how the telephone rings or produces some other different type of sound. For example, the telephone abstraction layer 82 need not say "play sound number 5," but need simply transmit to the telephone model driver 78 information indicating that it is appropriate to play the sound to indicate there is an incoming outside call. The telephone model driver 78 then determines what type of sound should be played by the physical telephone coupled to the system— or, indeed, no sound at all but a visual indication instead (such as if the user of the telephone is deaf or in an environment requiring quiet). The sound, display format, illumination, designation of function keys, etc. may all initially be preprogrammed in the telephone model driver 78, and preferably may be customized by the user. Likewise, the telephone model driver 78 may preferably use the information provided to it from the telephone abstraction layer 82 in the prioritized manner provided, or may selectively choose which information will be displayed based on other criteria. Still further, the telephone model driver 78 may access the directory 80 directly to extract information therefrom for display on the particular telephone coupled to the system as appropriate.

In the case of user programmability, the user telephone preference setup information may be stored by the telephone model driver within the directory under that particular user's entry. Alternatively, the telephone model driver may pass the customization information to the main telephony system 74 for provision to the directory 80 to maintain configuration control thereover. As a further alternative, the telephone model driver 78 may store the customization information therein or in a separate memory store.

Figure 4A:
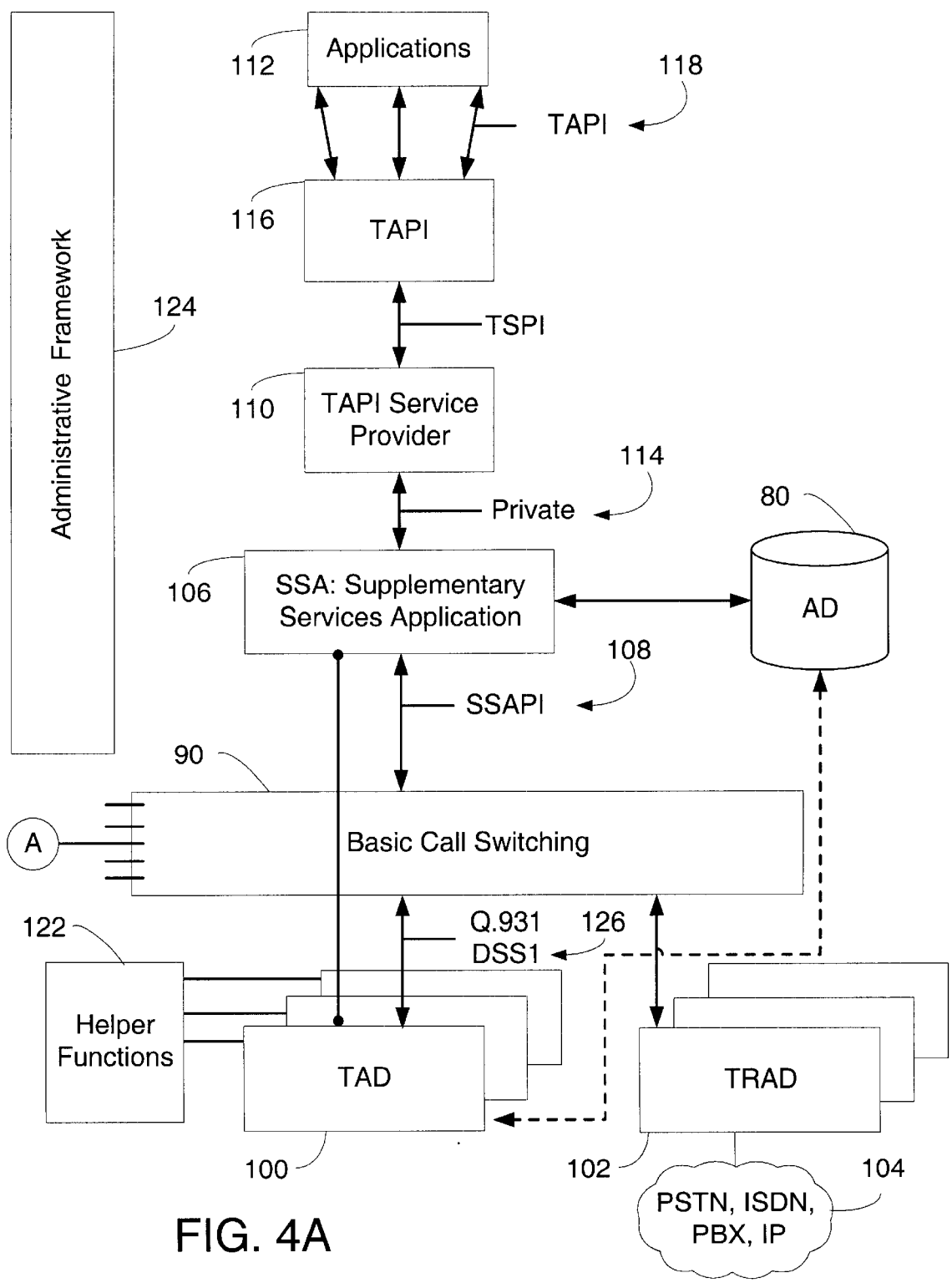
FIGS. 4a–b are block diagrams generally illustrating an exemplary embodiment of an open telephony system incorporating the teachings of the instant invention.
Figure 4B:
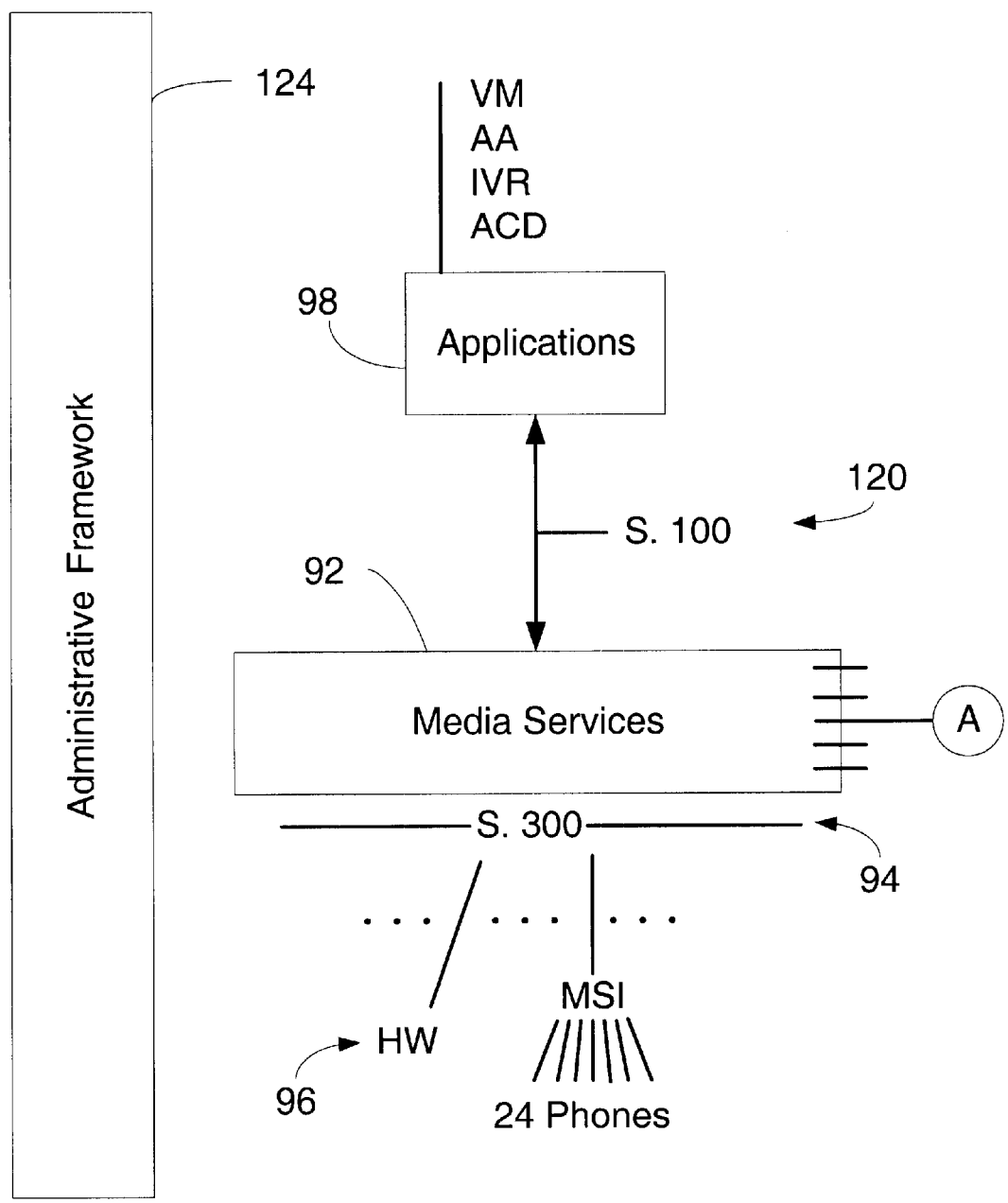

With an understanding of the system of the instant invention firmly in mind, specific attention is now drawn to FIGS. 4a and 4b which illustrates a simplified exemplary embodiment of the instant invention as coded utilizing the benefits of Microsoft's Component Object Modeling™ (COM™) structure. The core of this exemplary telephony system is the basic call switching element 90, which contains the knowledge of how to connect system elements to make calls. This basic call switching element 90 may operate in concert with a media services module 92, a software module that knows how to route media streams between devices and software modules. The operation, structure and functionality of such media services modules is well known in the art as exemplified by the White Paper entitled "CT Media: A Breakthrough in Client/Server Computer Telephony", the teachings and contents of which are hereby incorporated by reference. The media services module 92 may utilize a standard low level interface 94 called S.300, which has been defined by the Enterprise Computer Telephony Forum (ECTF) to describe the interface with the telephony system hardware 96; other low level interfaces are also used in comparable systems. This hardware includes elements such as a telephone line interface card, digital signal processing (DSP) cards that know how to do speech recognition or playing and recording of audio files, multiple station interface (MSI) cards for supporting multiple internal lines, etc. Above the media services module 92 in this simplified diagram exist applications 98. These perform functions such as voice mail (VM), unified messaging (UM), automated attendant (AA), interactive voice response (IVR), automatic call distribution (ACD), etc.

Beneath the basic call switching element 90 are what may be termed interface drivers. The first may be termed telephone abstraction drivers (TADs) 100 and the second trunk abstraction drivers (TRADs) 102. The (TAD) 100 is the driver for a telephone written and supplied by a third-party telephone manufacturer to allow their model telephone to operate with the telephony system in accordance with the teachings of the instant invention. The second interface driver, the trunk abstraction driver (TRAD) 102, is the driver for a network interface 104, such as a public switch telephone network, ISDN, another PBX if the system is part of a larger corporate network, or an IP network in the new telephony paradigm. There may exist multiple TRADs 102, a different one for each different network type. There also may be multiple TADs 100 installed in the system, one for each different type or model of phone. The phone types may include, for example, standard analog type phones used in a residence, ISDN phones, proprietary digital phones utilizing signaling which is not defined by any standard and may be different for each manufacturer, and IP phones designed in accordance with various standards, such as ITU-T Recommendation H.323, ITU-T H.248 (also known as Media Gateway Control Protocol, or MEGACO), IETF Session Initiation Protocol (SIP), etc. While a typical switch only supports one type of phone or possibly an analog plus a proprietary digital phone, through the telephone abstraction of the instant invention, the telephony system can support all these different types of phones.

Above the basic call switching module 90 is a layer termed the Supplemental Services Application (SSA) 106 which controls most of the telephony functions beyond basic point-to-point calls. The interface between the SSA 106 and the basic call switching module 90 is a supplementary services application program interface (SSAPI) 108. While the basic call switching module 90 can perform basic calling functions, it relegates the complex functionality to the SSA 106. As an example, if someone on an internal phone dials the extension number of another internal phone, it is possible for the basic call switching module 90 to independently connect that call to that other phone just by establishing a connection between the TADs for each of the telephones. However, the basic call switching module 90 is limited beyond this rudimentary functionality, and most commonly would not even establish a basic call between telephones without reference to the supplementary service application for application of services such as call forwarding, call blocking, etc. Most telephony functions, such as transferring, conferencing, holding, forwarding, parking, picking up a call within a group, and the hundreds of other features expected from a commercial quality PBX system today, are implemented in the SSA 106.

Above the SSA 106 is the telephony service provider 110, which is an abstraction level that allows the telephony applications 112 to properly interface with a variety of different types of telephony system switches. The service interface 114 is at this level is a private API. In an alternate embodiment of the instant invention, the SSA 106 and the telephony service provider 110 could be a single module. However, since the service provider 110 has to run in the process address space of the Telephony API (TAPI) 116, it is highly desirable to not have the entire core switching software executing withing the same process as TAPI since, if any of the telephony service providers were to fail due to a programming error, it could result in the entire core switching software being halted. If these modules are separated as illustrated in FIGS. 4a and 4b, the same same programming error would affect only TAPI 116. This is an acceptable situation because Microsoft has designed TAPI 116 so that it may be restarted.

Above the TAPI 116 layer exists the telephony applications 112 which perform advanced call control. The interface 118 between these applications and the TAPI level is actually also called TAPI 116. The interface 120 to the telephony applications 98 above the media services element 92 is typically the S.100 media services application programming interface defined by ECTF.$_{[TN1]}$ TAPI 118 has two major parts, the "line" functions and the "phone" functions. The line functions basically act on calls and provide functions such as dialing a call, hanging up, transferring, etc. The phone functions of TAPI 118 act on an abstraction of a phone, displays, buttons, lamps, ringers, speakers, microphones, etc. As discussed above, the core of the switch needing knowledge of specific elements of a telephone relates to the supplementary services. The benefits of the instant invention are realized in large part as a result of the interaction between the TAD 100 and the SSA 106. If one were to follow the design strategy of conventional telephony systems, the SSA 106 would be required to know much specific information about every phone to be utilized with the system including its display size, the number of buttons it has, the number of lamps it has, the blink modes of the lamps, the ring and sound types, etc. This information would be required to be imbedded in the SSA. In this way, whenever the SSA needed to accomplish a function, such as a call transfer, it must recognize that "button number B" means "initiate a call transfer", and must specifically send commands down to the phones affected to say "make lamp number F be on steady," etc.

The telephone abstraction of the instant invention significantly affects the required information and logic within the SSA 106 and the nature of the messages that get sent from the SSA 106 down to the TAD 100. With this abstraction of a phone being used at the SSA level 106, no longer does the SSA 106 have to know about different types of phones connected to the telephony system. The SSA 106 need not know anything about lamps or buttons or ringers or displays, etc. All the SSA 106 need know, and at a fairly high level, is that it wants to indicate to the user that call forwarding is active, or that it wants to indicate to the user the identity of who is calling through caller ID, etc. The SSA 106 does not need to know how big the display is, how tall, high, wide, or even what language is being displayed on the phone. All of the specifics of the particular phone model, its proper button assignments and programming, its illumination modes, ring types, display features, etc. will be taken care of by the TAD 100.

A benefit of the instant invention, in addition to providing an open phone model, is that the phones become language independent. Since the interface between the SSA 106 and the TAD 100 is language independent, the TAD 100 can display any required language. For example, for a user in Switzerland or for a company that is in Switzerland which is required by the Swiss government to make everything available in German and French and Italian and Romansch, the four official languages in Switzerland, the code of the SSA 106 would be extremely bloated under the prior design paradigm to be able to supply these requirements. However, utilizing the teachings of the instant invention, the code to perform this multi-language display is isolated down in the TAD 100 and related helper functions, and allows the SSA 106 to be very clean and simple. All the SSA 106 need be concerned with is call state transitions and the type of information that could be conveyed to the user. The actual formatting of and decision making about this information is left to the TAD 100.

This formatting and decision making preferably includes making decisions about whether a particular function should be on a hard key or a soft key or possibly accessed via a feature access code, such as "*2", depending on the type of phone. In additional to relatively unintelligent phones, third-party manufacturers may supply a TAD 100 for a "functional" phone such as an ISDN phone. A "functional" phone includes intelligence within itself to produce proper displays and indications based on call state, and to translate button presses and other function invocations into specific call control actions. A TAD 100 designed to be used with a functional phone would not need to be too concerned about the specific text that was going to be displayed. Instead, the TAD 100 would simply convey the information to the phone and the phone takes care of properly displaying the information, although the TAD would need to understand precisely what the phone will do in each state in order to track the phone state and reflect it properly to other elements of the telephony system.

The system of the instant invention also contemplates the inclusion of a set of helper functions 122, the use of which is available to all of the TADs 100 in the system. The helper function objects 122 may preferably contain common code for use by the TADs 100 to reduce the requirement for repeated code in each of these TADs 100. For example, there are industry standards which define standard information display formats for standard telephone displays. One such standard has been established by Tecordia (Bellcore), primarily for ISDN Centrex. However, this standard has been widely applied to PBX systems for how things should be displayed on phones. This may be thought of as the "least common denominator" for phone displays. There standards typically only define standards for two lines by twenty character displays, which are available on many standard telephones. However, by today's phone standards, this may not provide enough information to be commercially successful.

In operation, the TAD 100 would take the abstract display requests coming from the SSA 106 and call the helper function 122 to retrieve the preformatted messages for the standard type phone. This preferably accommodates different size displays as well. Essentially the inclusion of the helper functions 122 recognizes that while there is a telephone abstraction layer, there are some standard display formats defined by these well-known standards. Therefore, the prewritten code for those display formats can be included in the helper function 122 to allow further condensation of the TAD objects 100 supplied by the telephone manufacturer. Further, the helper functions 122 may include a table of strings that could be localized into different languages to further reduce the amount of code required in the TAD 100 to support worldwide distribution of that model telephone.

As an example, if a phone is to display "transfer," "conference," and "hold" on soft keys, as well as displaying "outside caller" when no caller ID information is received, these types of standard strings would be stored in the helper function 11. This reduces the amount of code required in the TAD 100 to generate these standard display strings. Likewise, since these standard display stings may be localized, the TAD 100 need not perform language translation on these strings either. Therefore, when the SSA 106 tells the TAD 100 that the current call is from an outside caller but no caller ID information is known, the TAD 100, instead of having to have its own list of all those strings, simply calls the helper function 122 to get those strings in whatever language the phone was set to at the moment.

Since, as described above, many of the proprietary digital phones do not comply with any standard, a separate TAD 100 would be required for each type of phone. It is envisioned that a manufacturer may create a TAD 100 that knows about a range of different phones. If a manufacturer has several different proprietary digital phones that they want to support, and they all share similar features, there is nothing to stop them from having one TAD 100 that would expose all of those different phone types. Logically, such a TAD 100 would look the same as separate TADs 100. As an example, a single TAD 100 could support standard analog phones and Telcordia (Bellcore) standard analog display services interface (ADSI) phones, which include soft key displays. Some manufacturers may be able to supply a single TAD 100 to support all of the models it produces, but this is left to the manufacturers.

TAD 100 support for other types of "standard" phones will be provided as well. Preferably, a telephony system of the instant invention includes standard TADs 100 for standard analog phones, standard ISDN phones, standard H.323 phones, and H.323 personal computer endpoints. As additional standards are adopted, such as MEGACO and SIP phones, TADs 100 will become available to support them as well. This standard TAD 100 support allows manufacturers to supply only the hardware without requiring them to also write a TAD 100, so long as the phone conforms to the appropriate standard. But the writing of the TADs 100 for the proprietary digital phones will be entirely up to individual manufacturers.

This requirement is driven because the TAD 100 needs to be aware not only of the characteristics of the phone, but also the way it is connected to the switch. As will be recognized by one skilled in the art, the TAD 100 may not interface directly to the phone hardware. There are a plurality of interface adapters available from various manufacturers Low-level hardware drivers for such adapters may be interfaced to the system via S.300 or similar interfaces to the media services element 92 rather than directly to the basic call switching element 90. In this embodiment, the basic call switching element 90 controls higher level functions such as call routing and dial plans plans, and leaves the low level interfacing to the media switching element 92. However, these two objects 90, 92 cooperate to accomplish the telephony functions. Thus, when a TAD 100 needs to interact with a phone, it may not actually do so directly, but instead through the media services element 92 and then to the phone.

Through the system of the instant invention, the nature of the messages that go from the supplementary services application (SSA) 106 to the TAD 100 are changed so that the core software of the telephony system may operate on an abstract level, not tied to any particular phone. Instead of transmitting specific commands that address positions on the telephone display, lamps, buttons, etc., the SSA 106 may simply send an abstract notion of what could be displayed or what ought to be displayed and allows the lower level driver for the phone (the TAD) 100 which knows the phone's characteristics to do the best it can to display as much as possible.

As an example, if Joe Smith is calling and his extension number is 62792, the TAD 100 will display that information the best way it can. In fact, the SSA 106 would actually send a large number of information elements to the TAD 100. This information could include the caller's abbreviated name, e-mail name, full name, extension number, outside line number, etc. This information is preferably extracted from the directory 80 or database, or may be transmitted with the call. The TAD 100 makes the best use of that information possible with that type of phone. If the phone has a large graphical display, it might display all the information, including even a photograph of the caller, etc.

As an alternative to the SSA 106 pulling the information and transmitting it all to the TAD 100, some of which might be ignored based upon the type of phone utilized, the SSA 106 could simply provide a pointer or key into the directory or user database 80 to the TAD 100. The TAD 100 would then go to the directory or user database 80 and read only those elements which it is capable of displaying on the phone. This alternate embodiment reduces overhead and improves efficiency and performance since the SSA 106 would no longer need to extract information from the directory and provide it to the TAD 100 only to have the TAD 100 discard it because it is unable to display it on the type of telephone. For example, a standard analog phone does not have a display at all; it would be wasteful and inefficient for the SSA 106 to provide unusable display information to the TAD 100.

In either case, the use of the directory or user database 80 by either the SSA 106 or the TAD 100 (or both) is enabled through the common administration framework 124 of a preferred embodiment of the instant invention, which is interfaced to by all of the modules described herein. In this preferred embodiment, all of the applications and all the system components interface using the same administrative framework 124 and the same databases 80. By using such a common framework, an administrator would not have to separately add a user to the voice mail system, to the telephony switch, to the e-mail system, and every other place as is common today. With the system of the instant invention, a user no longer needs a professional telecommunications manager or an outside system administrator to handle such administrative tasks. The inside administrator simply adds the user in one place, and it is done.

With the system of the instant invention, an end user is no longer tied to only the phone supplied by the telephony system provider. Third-party manufacturers who are simply in the business of building phones could build the phone and the TAD 100 that goes with it, and then directly solicit the end user, value-added resellers, or telephone switch manufacturers. These third-party vendors could sell their phones with that manufacturers name on the phone and the plastic color they want, and other desired customization.

In addition to the interfacing of the abstraction for the display and control information, the TAD 100 also converts the call control protocol that is used between the phone and the telephony switch and converts it into an abstraction of the call control protocol. This abstraction may be modeled after ITU-T Recommendation Q.931 126, which is the ISDN call control protocol, or other standard call control protocols familiar to those skilled in the art. The TAD 100 expects to see primitives or messages from the basic call switch element 90 in terms of the abstracted call control protocol, and it generates the appropriate responses back. The TAD 100 then translates these primitives into the signaling that is used for the phone.

While the TAD 100 is tasked with performing the low level phone functions from the abstract high level messages from the SSA 106, TAPI 116 also exposes some low level phone functions to telephony applications. As discussed briefly above, TAPI 116 also abstracts a phone, but does so as a rectangular text display with P number of buttons and Q number of lamps. The TAPI low level functions include things like "turn on lamp number 14." As will be recognized, this appears to be an abstraction of the low level interface that the telephone abstraction in the SSA 106 dispenses with.

To deal with this residual TAPI low level interface, the low level phone functions will be intercepted by the TAPI Service Provider 110 which knows about those functions. The TAPI Service Provider 110 will translate these residual low level functions into information that can be shared at the higher level interface with the displays and other phone features generated in the SSA 106. As a result of this residual TAPI function, one of the elements of a message from the SSA 106 to the TAD 100 may contain some fields which contain the abstract rectangular text display that would have come from a TAPI application 112 for a specific button and lamp, etc. These messages are passed down to the TAD 100, which then determines what information and commands it thinks are more important. The TAD 100 will decide whether it is more important to display the call state information that came from the SSA 106 or whether it is more important to display what the TAPI application 112 is requesting to be displayed. If the TAD 100 knows that the phone has a large graphical interface, it might in fact be able to display both sets of information simultaneously.

One type of TAPI application 112 which often attempts to perform low level functionality is an Automatic Call Distribution (ACD) application used in call centers and customer service centers. When a customer calls a system with ACD, he hears an announcement message which prompts him to press a number to get certain product support. The customer is then placed in a queue waiting for the next customer service representative or product support person. When someone from that group is available, the customer's call gets connected to the representative. In these ACD systems, there is a lot of information that ACD agents like to know, such as how many calls are in a queue, the longest time someone has been on hold, etc. It is understood by those skilled in the art that such information can help the agents accelerate their work and provide better service. An ACD application 112 often takes control of the phone display in order to provide such information to the agents. If the agent has a phone that has the capability, it could display all the information from the SSA 106 plus the information from the ACD application 112 at the same time. Therefore, the telephony system preferably does not make the decisions about what can be displayed at this system level. The TAD 100 could be driving a PC which utilizes completely different windows on the display for such ACD information from the application. Therefore, this low level information is passed to the TAD 100 so that it can determine what it wants to display.

Another advantage of the system of the instant invention is that the users will be able to set up their own personality for their phone. With the widespread use of PCs, people have become quite accustomed to being able to completely personalize their workstation by setting their display colors, window placement, font size, and sound schemes. To extend such personalization to the telephony system, the system of the instant invention allows the TAD 100 to add its own sections to the user database 90 or directory on a per user basis. In this way, the stored personality of the phone is in the user database 80 so that if the user goes to another office, the customization can follow. In some work environments people do not have a fixed office or cubicle that they go to everyday. This environment is called "hoteling". In some such offices, the workers who are in the office on a particular day retrieve a cart or similar mobile storage container containing their personal materials and select an available office or cubicle for use for the day. Such as method of assigning temporary workspaces on a daily basis is becoming popular in the case of outside sales organizations where people are out of the office more than they are in, as well as in call centers. Once the employee finds a cubicle, which has a generic phone in it, the employee identifies themselves to the telephone system ("logs into the phone") so that the system knows where the employee is. In addition to being able to automatically route calls to the employee, the phone is updated to that employee's customized settings, including such things as their own speed dials, ring types, etc.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A computer-readable medium having computer-executable components, comprising a telephony component providing core telephony functions, said telephony component including a telephone abstraction layer which transmits abstract telephone control commands in response to operation of said core telephony functions.

2. The computer-readable medium of claim 1, further comprising at least one telephone model drive component for translating said abstract telephone control commands into telephone model specific control commands.

3. The computer-readable medium of claim 2, wherein said telephone model driver component further translates telephone model specific control requests into abstract telephone control requests.

4. The computer-readable medium of claim 3, wherein said telephone model driver component further translates telephone model specific information into abstract telephone information.

5. The computer-readable medium of claim 1, wherein said telephone abstraction layer transmits abstract display information in response to operation of said core telephony functions.

6. The computer-readable medium of claim 5, wherein said telephone abstraction layer transmits abstract display information in a prioritized fashion.

7. The computer-readable medium of claim 5, wherein said at least one telephone model driver component selects at least a portion of said information for display on a particular model telephone, said at least one telephone model driver component thereafter formatting said at least a portion of said information for proper display on the particular model telephone.

8. The computer-readable medium of claim 5, further comprising a user database component for storing at least telephony user information, and wherein said telephony component accesses said user database component to extract at least a portion of said telephony user information therefrom.

9. The computer-readable medium of claim 8, wherein said telephone abstraction layer transforms said at least a portion of said telephony user information into said abstract display information.

10. The computer-readable medium of claim 5, further comprising a user database component for storing at least telephony user information, and wherein said telephone abstraction layer transmits pointer information related to at least an entry in said user database component.

11. The computer-readable medium of claim 10, wherein said telephone model driver component utilizes said pointer information to access said user database component to extract at least a portion of said telephony user information.

12. The computer-readable medium of claim 5, further comprising a user database component for storing at least telephony user information, and wherein said telephone model driver component provides at least a portion of said telephony user information for storage in said user database component.

13. The computer-readable medium of claim 12, wherein said telephony component stores said at least a portion of said telephony user information provided by said telephony model driver component in said user database component.

14. The computer-readable medium of claim 2, further comprising at least one helper component including standard information display strings for use by said telephone model driver component.

15. The computer-readable medium of claim 14, wherein said helper component further includes localized language strings.

16. A computer-readable medium having computer-executable components, comprising a telephone model driver component for translating between abstract telephone control commands and telephone model specific control commands.

17. The computer-readable medium of claim 16, wherein said telephone model driver component further translates telephone model specific information into abstract telephone information.

18. The computer-readable medium of claim 16, wherein said telephone model driver component selects and formats at least a portion of display information for display on a particular model telephone.

19. In a telephony system including a telephone abstraction layer, a station set, comprising:

a telephone; and a telephone model driver component for interfacing said telephone to the telephony system, said telephone model driver translating telephone specific commands and information to and from abstract telephone control commands and information.

20. The station set of claim 19, wherein said telephone includes a visual display, and wherein said telephone model driver selects and formats information for display on said visual display.

21. The station set of claim 19, wherein said telephone includes a plurality of control buttons, and wherein said telephone model driver senses selection of said control buttons and generates an abstract telephony control signal in response thereto.

* * * * *

UNITED STATES PATENT AND TRADEMARK OFFICE
CERTIFICATE OF CORRECTION

PATENT NO. : 6,584,185 B1
DATED : June 24, 2003
INVENTOR(S) : Toby Lee Nixon

It is certified that error appears in the above-identified patent and that said Letters Patent is hereby corrected as shown below:

Column 1,
Lines 49 and 59, "modem" should read -- modern --.

Column 2,
Line 20, "system, These" should read -- system. These --.

Column 16,
Line 47, "drive" should read -- driver --.

Signed and Sealed this

Twenty-fifth Day of November, 2003

JAMES E. ROGAN
*Director of the United States Patent and Trademark Office*